United States Patent [19]

Numazawa et al.

[11] Patent Number: 5,027,246
[45] Date of Patent: Jun. 25, 1991

[54] THIN FILM MAGNETIC HEAD AND A METHOD FOR MANUFACTURING THEREOF

[75] Inventors: Junji Numazawa, Tokyo; Fusayoshi Aruga, Shimosuwa, both of Japan

[73] Assignees: Nippon Hose Kyokai, Tokyo; Kabushiki Kaisha Sankyo Seiki Seisakusho, Shimosuwa, both of Japan

[21] Appl. No.: 408,492
[22] PCT Filed: Dec. 27, 1988
[86] PCT No.: PCT/JP88/01338
  § 371 Date: Aug. 23, 1989
  § 102(e) Date: Aug. 23, 1989
[87] PCT Pub. No.: WO89/06422
  PCT Pub. Date: Jul. 13, 1989

[30] Foreign Application Priority Data

Dec. 28, 1988 [JP] Japan .................. 62-329860

[51] Int. Cl.⁵ ............................................ G11B 5/147
[52] U.S. Cl. ................................................. 360/126
[58] Field of Search ...................................... 360/126

[56] References Cited
FOREIGN PATENT DOCUMENTS 61-172206 8/1986 Japan .

Primary Examiner—A. J. Heinz
Attorney, Agent, or Firm—Notaro & Michalos

[57] ABSTRACT

A thin film magnetic head for use in a running direction with respect to a magnetic recording medium and in which a first magnetic material, a non-magnetic layer, a conductor layer, and a second magnetic material layer which constitute a pair of magnetic poles in cooperation with said first magnetic material layer, are laminated on a non-magnetic substrate, has the conductor layer and the second magnetic material layer formed to be parallel to the running direction. The first magnetic layer is formed to be nonparallel to the running direction in at least an opposed surface area of the head which is to be opposed to a magnetic recording medium. The second magnetic material layer is formed so that it is opposed to the magnetic recording medium at the opposed surface area and so that the second magnetic material layer progressively extends away from the magnetic recording medium in an area of the head which is outside said opposed surface area.

11 Claims, 10 Drawing Sheets

THIN FILM MAGNETIC HEAD AND A METHOD FOR MANUFACTURING THEREOF

TECHNICAL FIELD

The present invention relates to a magnetic head which can be used for perpendicular recording/reproducing purposes, or for reproducing data stored in an ordinary magnetic recording medium of the longitudinal type, and to a method for manufacturing such a magnetic head. More particularly, the invention pertains to a thin film magnetic head in which two thin films of first and second magnetic layers constitute a pair of magnetic poles, and a method for the manufacture of such a thin film magnetic head.

TECHNICAL TERMS

In this specification, a term "opposed surface area" is intended to mean a surface area of the magnetic head which is a limited area for allowing recording/reproducing of data onto and from a magnetic recording medium. That is, where the magnetic head is of the type that makes contact with the magnetic recording medium, the definition of "opposed surface area" is a surrounding, adjacent area of a first magnetic material layer on the magnetic head. Where the head is of the type that performs recording the reproducing without contact with the magnetic head, the "opposed surface area" is the area on the magnetic head which is held out of contact with the magnetic medium, but which is adjacent the medium at a distance sufficient for the recording/reproducing purpose. A term "head running direction" is intended to mean the direction in which the magnetic head travels relative to the magnetic recording medium in both cases where the magnetic head runs on the magnetic recording medium and where the latter runs on the former.

BACKGROUND ART

Figure 12:
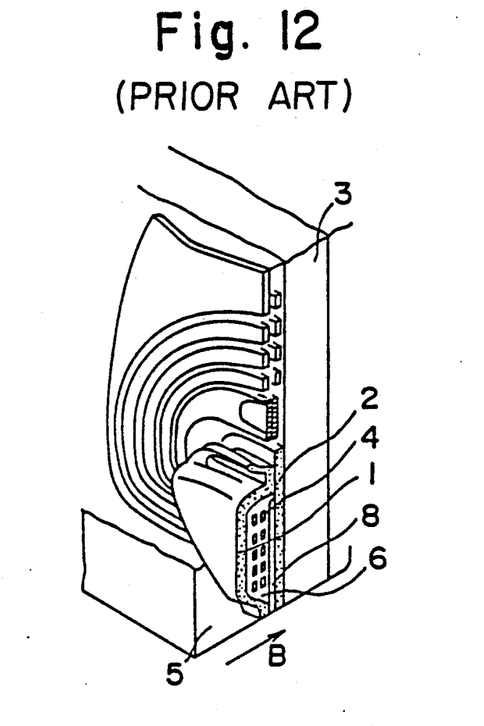
FIG. 12 is a perspective view showing, in section, the principal part of an example of a conventional thin film magnetic head.
Figure 13:
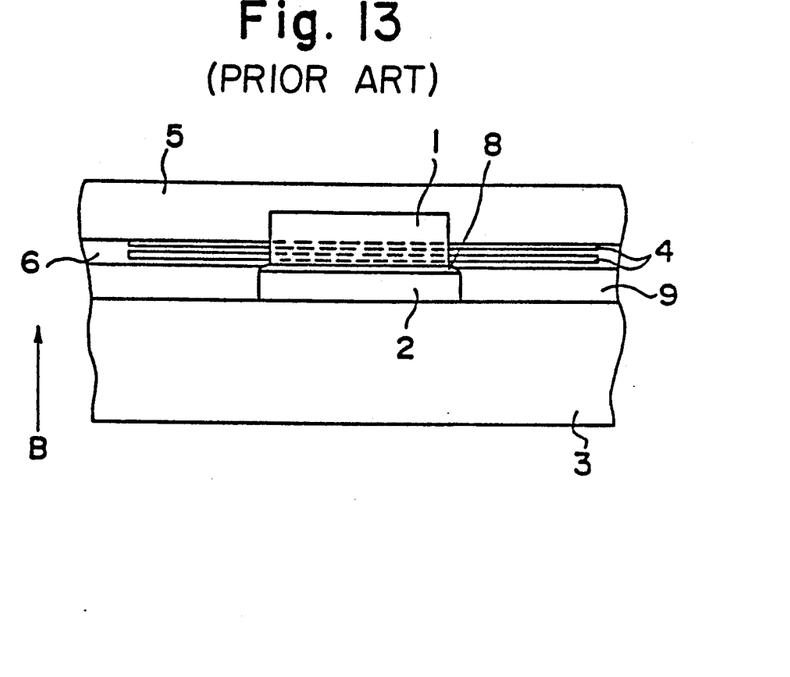
FIG. 13 is a plane view of the conventional head as viewed from the side of its sliding surface.
Figure 14:
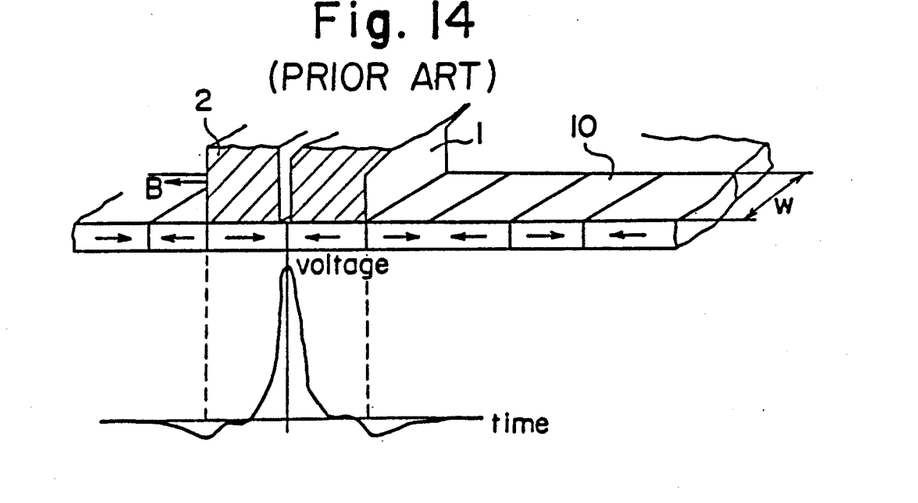
FIG. 14 is a diagram showing the process of reproduction by the conventional thin film magnetic head and a solitary reproduced waveform.

A conventional thin film magnetic head is formed, as shown in FIGS. 12 and 18, by laminating on a non-magnetic substrate 3 a second magnetic material layer 2, a gap material 8, coil conductor layers 4, and a first magnetic material layer 1 which constitutes a pair of magnetic poles with the second magnetic material layer 2 in this order. Usually, in this kind of thin film magnetic head, the first magnetic material layer 1, the gap material 8, the coil conductor layer 4, and the second magnetic material layer 2 are all provided in planes parallel to the surface of the non-magnetic substrate 3, and the head is disposed so that it runs on a magnetic recording medium (not shown) in a direction perpendicular to the above planes for recording and reproducing. Such a thin film magnetic head inevitably suffers from the generation of a waveform distortion or false pulse which is caused by the thicknesses of first and second magnetic material layers i and 2, as shown in a solitary reproduced waveform diagram of FIG. 14. The waveform distortion occurs when a false gap parallel to the recording and reproducing gap of the magnetic head is formed in its surface area opposed to the magnetic recording medium 10. In the thin film magnetic head, in particular, since the thicknesses of the pair of magnetic poles formed by the first and second magnetic material layers 1 and 2 are approximate to the wavelength for recording, the false pulse by the false gap distorts the signal waveform reproduced from the true gap, impairing the reproduced signal quality.

Figure 15:
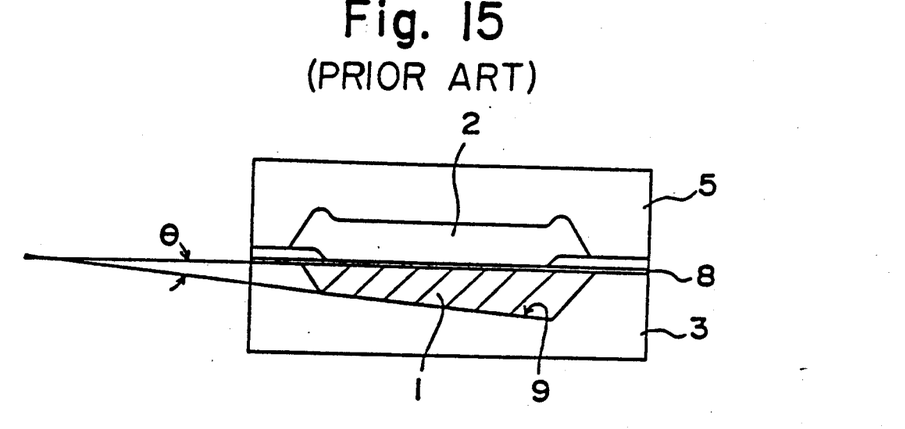
FIG. 15 is a plan view of another conventional thin film magnetic head as viewed from the side of its sliding surface.

A method that has been proposed for reducing the waveform distortion is disclosed in Japanese Patent Laid-Open Gazette No. 205508/87, for example. According to this method, the thickness of the first magnetic material layer 1 is varied widthwise of the magnetic track on the recording medium so that the bottom 9 of the first magnetic material layer on the opposite side from the gap material 8 is inclined thereto, as shown in FIG. 15. The magnetic head of this structure is capable of suppressing the generation of the false signal by the false gap and hence lessening its influence but is incapable of completely removing the waveform distortion. Fur&her, &he manufacture of such a magnetic head involves many machining steps such as the formation of a groove having a bottom inclined by an angle θ in the non-magnetic substrate 3, sputtering of the first magnetic material layer 1 on the substrate S, and subsequent lapping of its surface-this is not preferable as the thin film magnetic head manufacturing process. In addition, since it is difficult to improve the surface roughness of the bottom surface of the groove inclined by the angle θ, there is a fear of providing poor magnetic characteristics of the first magnetic material layer 1.

Figure 16:
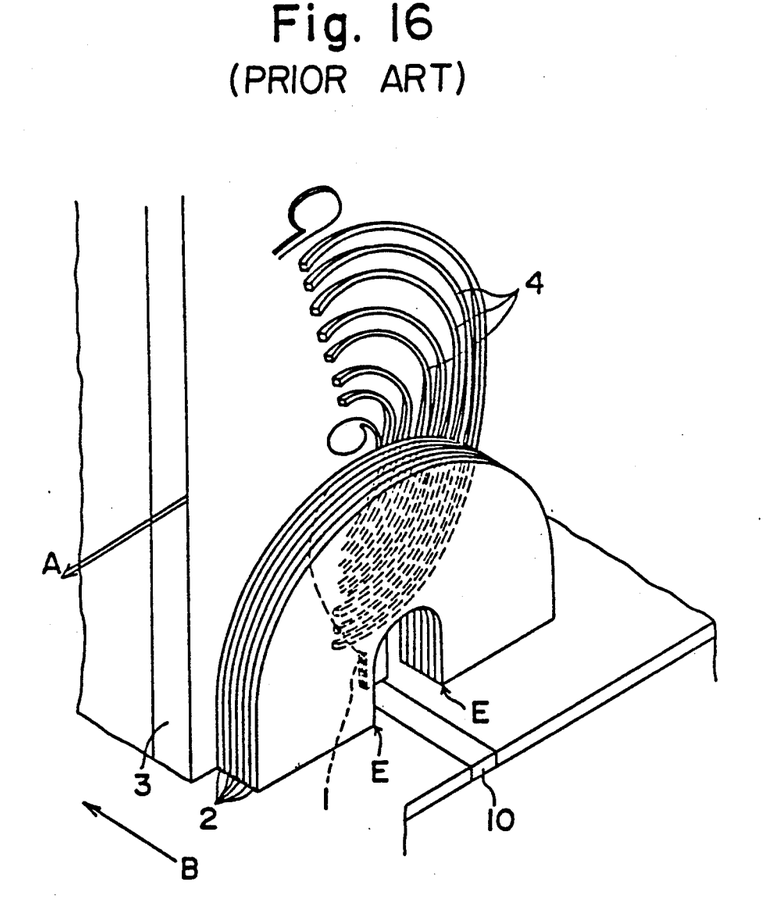
FIG. 16 is a perspective view showing still another conventional head.

Another prior art method proposed as a solution to the above problem is shown in FIG. 16, in which first and second magnetic material layers 1 and 2 on the non-magnetic substrate 3 are spaced apart in the direction A widthwise of the magnetic track (Japanese Patent Laid-Open Gazette No. 95713/87). This magnetic head structure is capable of eliminating the waveform distortion but encounters a problem of crosstalk from adjoining other &racks and overwrite thereinto which are caused by edge portions E of the second magnetic material layer 2 in the opposed surface area.

DISCLOSURE OF THE INVENTION

It is therefore an object of the present invention to provide a thin film magnetic head which is free from the waveform distortion by the false pulse.

Another object of the present invention is to provide a method for manufacturing of a thin film magnetic head which does not involve machining and lapping for the formation of the first magnetic material layer.

According to an aspect of the present invention, the thin film magnetic head has a non-magnetic layer, the coil conductor layers and a second magnetic material layer in planes parallel to the head running direction and a first magnetic material layer in a plane which is nonparallel or unparallel to the head running direction.

With such a structure, the second magnetic material layer parallel to the head running direction has neither of a gap and a false gap in the opposed surface area, and the first magnetic material layer unparallel to the head running direction in the opposed surface area can be formed to a sufficiently small thickness in the head running direction as compared with the recording wavelength. Consequently, it is possible to prevent the generation of the waveform distortion by a false pulse, reduce a peak shift amount in digital recording and a harmonic distortion and a frequency characteristic fluctuation (a contour effect) in analog recording and eliminate crosstalk from adjoining tracks and overwrite thereinto.

According to another aspect of the present invention, a second magnetic material layer, a first magnetic material, and another second magnetic material layer are formed on after another on a non-magnetic substrate, and coil conductor layers and a non-magnetic layer are provided between each of the second magnetic material layer and the first magnetic material layer. With this structure, it is possible to obtain a thin film magnetic head which is robust against an external electromagnetic induction disturbance.

According to still other aspect of the present invention, the thin film magnetic head comprises two non-magnetic layers formed along the head running direction another non-magnetic layer formed between the two non-magnetic layer along the head running direction, a second magnetic material layer formed between the second-mentioned non-magnetic layer and one of the first-mentioned two non-magnetic layers along the head running direction, a first magnetic material layer formed in the plane of the second-mentioned non-magnetic layer unparallel to the head running direction and connected to the second magnetic layer and coil conductor layers formed around the connecting portion of the first and the second magnetic material layers.

According to further other aspect of the present invention, the thin film magnetic head comprises a non-magnetic substrate formed along the head running direction, a second magnetic material layer formed on the substrate along the head running direction, a first magnetic material layer having an exposed end unparallel to the head running direction and partly connected to the second magnetic material layer, coil conductor layers provided between the first and second magnetic material layers and surrounding the connecting portion of the first and second magnetic material layers, and a non-magnetic head protective layer formed around the first magnetic material layer to protect it.

According to a method for manufacturing of the thin film magnetic head of the present invention, a second magnetic material layer, a coil conductor layer, a coil insulating layer, and a first magnetic material layer which constitutes a pair of magnetic poles together with the second magnetic material layer, are laminated in this order on a substrate. The first magnetic material layer of the thin film magnetic head is formed to a thickness corresponding to a desired track width and is then selectively removed by photolithography and etching or ion beam milling to have a desired angle to the film surface of the second magnetic material layer in the opposed surface area and a width sufficiently smaller than the recording wavelength. Consequently, the first magnetic material layer is formed very accurately to a width corresponding to the track width by film thickness control and to a desired thickness in the opposed surface area in the head running direction by etching or ion beam milling.

Thus, the manufacturing method of the present invention permits the manufacture of the thin film magnetic head of the invention without involving machining and lapping in the step of forming the first magnetic material layer, and hence is excellent in productivity and highly economical. Moreover, the method of the present invention provides a thin film magnetic head which is free from the influences of an increase in strain of the substrate, deterioration of the magnetic film and a increase in the roughness of the substrate surface which are caused by machining and lapping or grinding, that is, a thin film magnetic head which does not cause a waveform distortion nor generates a false pulse. By applying the present invention to a multi-channel thin film magnetic head, in particular, it is possible to reduce crosstalk from the adjoining tracks, obtaining excellent recording and reproducing characteristics.

BRIEF DESCRIPTION OF THE DRAWINGS

FIGS. 11 (A) to (D) illustrate in sequence of one example of the steps involved in the manufacture of the thin film magnetic head according to the present invention;

BEST MODE FOR CARRYING OUT THE INVENTION

With reference to the drawings, embodiments of the present invention will hereinafter be described in detail. In the embodiments the parts corresponding to those in the conventional thin magnetic heads described previously are identified by the same reference numerals and no detailed description will be given of them.

Figure 1:
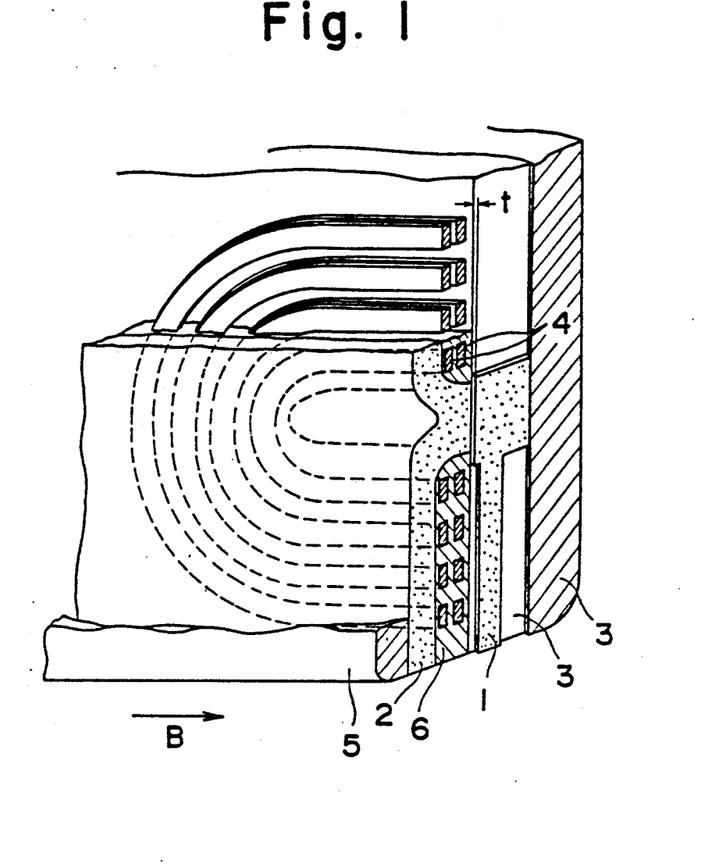
FIG 1 is a perspective view showing, in section the principal part of an embodiment of the thin film magnetic head according to the present invention along the line I—I in FIG. 2.
Figure 2:
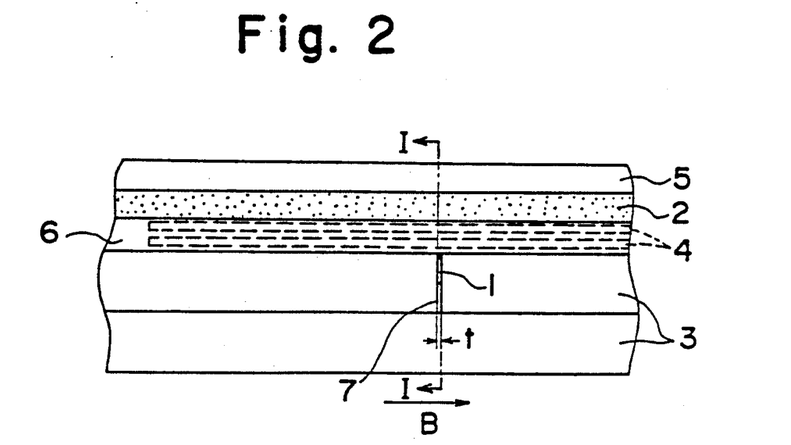
FIG. 2 is a plan view of the head as viewed from the side of its sliding surface.
Figure 3:
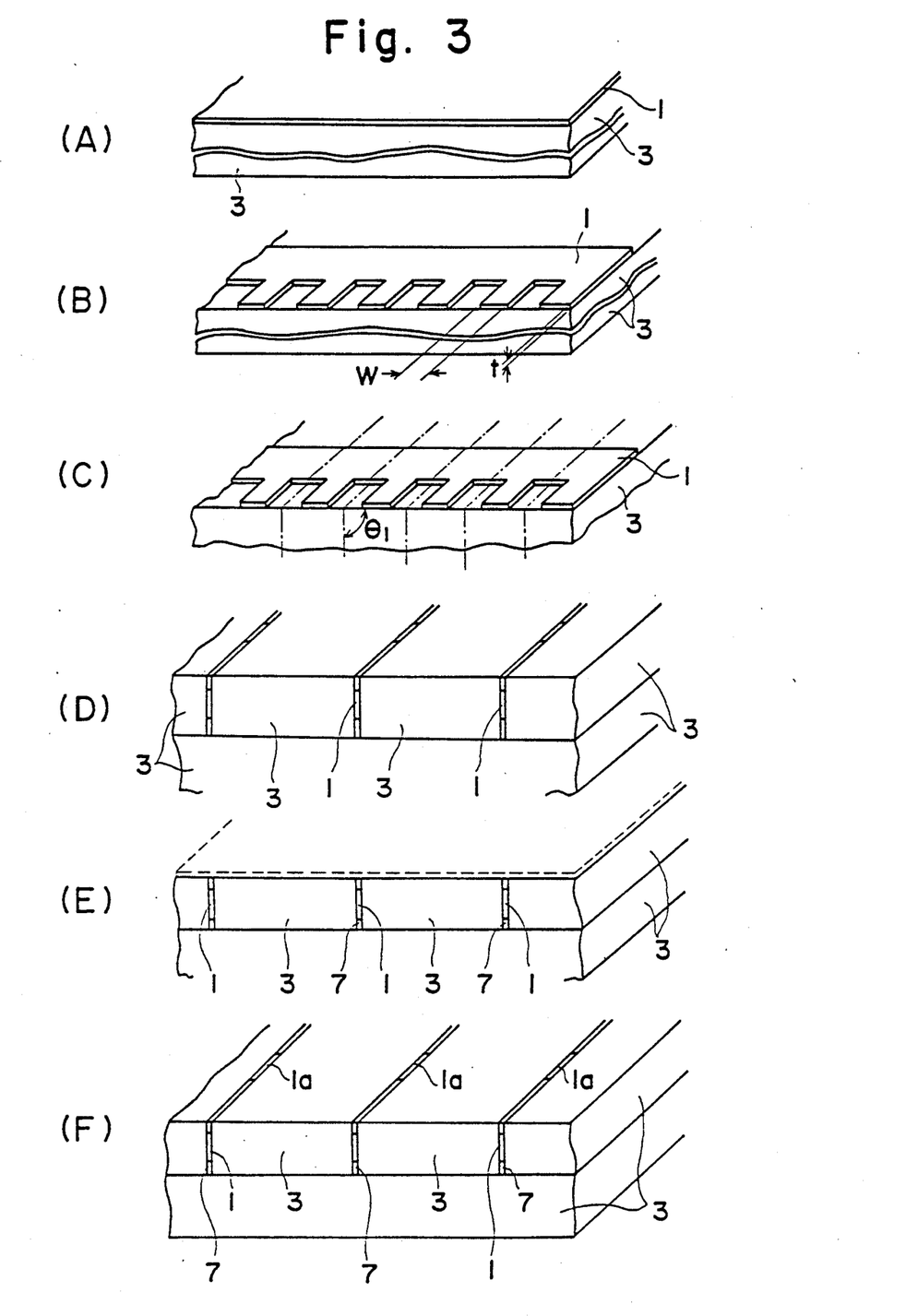
FIGS. 3(A) to (F) illustrate in sequence one example of the steps employed in the formation of a first magnetic material layer of the head depicted in FIG. 1.

FIGS. 1 and 2 illustrate an embodiment of the thin film magnetic head of the present invention. Reference numeral 1 indicates a first magnetic material layer, 2 a second magnetic material layer, a non-magnetic substrate, 4 coil conductor layers. 5 a head protective film formed of an non-magnetic or magnetic material, 6 a coil insulating layer, and 7 a fusing or adhesive agent. In this thin film magnetic head the coil insulating layer 6, the coil conductor layers 4, the second magnetic material layer 2, and the head protective film 5 are sequentially laminated on the non-magnetic sub&rate $ in parallel to the head running direction B and the first magnetic material layer 1 is formed on the non-magnetic substrate 3 in a direction nonparallel or unparallel to the head running direction. The first and second magnetic material layers and 2 thus provided nonparallel or unparallel to each other constitute a pair of magnetic poles, which are spaced apart by the coil insulating layer 6 formed of a non-magnetic material. The second magnetic material layer 2 is formed to be gradually spaced apart from the recording medium so that it has no edge in the head running direction B. While in this embodiment the first and second magnetic material layers 1 and 2 are formed on the non-magnetic substrate 3 so that they are unparallel to each other, the invention is not limited specifically to the above structure. The essential thing is to form the second magnetic material layer 2 in a certain plane parallel to the head running direction B and the first magnetic material layer 1 in a certain plane unparallel to the second magnetic material layer 2. The first and second magnetic material layers 1 and 2 are each formed by a soft magnetic film such as an amorphous film of the cobalt series (a Co—Zr—Nb amorphous film, for instance) or sendust film the non-magnetic substrate 3 is formed of crystallized glass or ceramics of the alumina series for example the coil conductor layers 4 are formed by aluminum, copper or similar films; and the head protective film and the coil insulating layer 6 are formed of silicon dioxide or a photoresist material, for instance.

Figure 10:
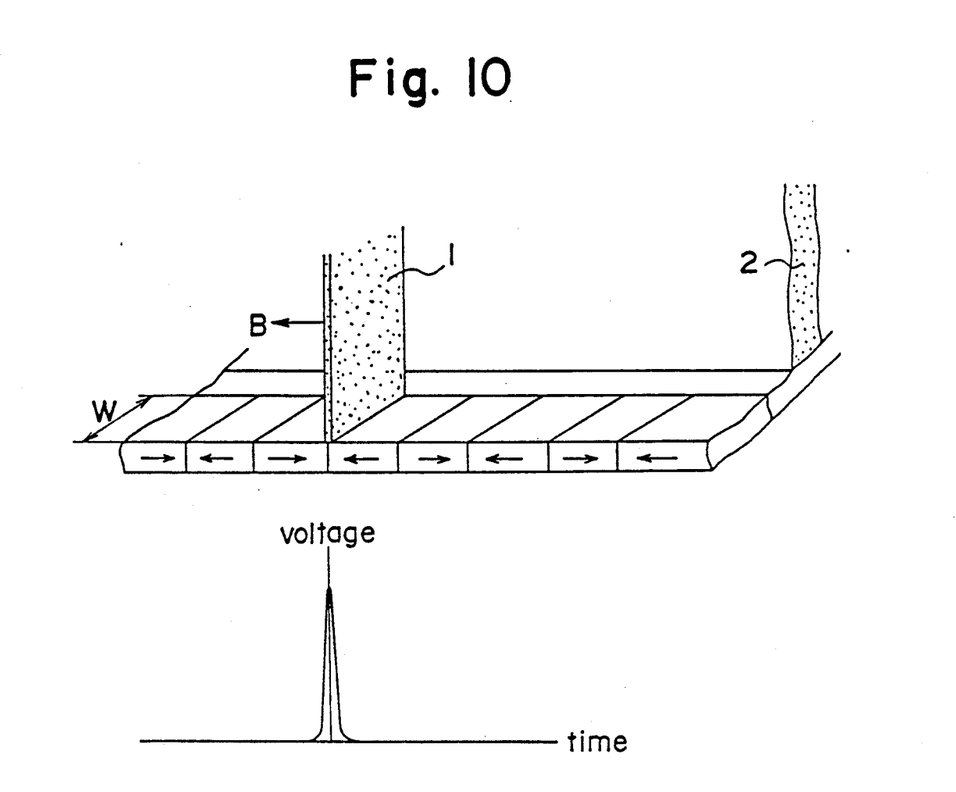
FIG. 10 is a diagram showing the process of reproduction by the thin film magnetic head of the present invention and a solitary reproduced waveform.

In this specification, what is intended to mean by "the first magnetic material layer 1 is unparallel" is that either plane in which the first magnetic material layer 1 is in contact with the non-magnetic substrate 3 is not parallel to the head running direction B, i.e. to the second magnetic material layer 2 in at least the opposed surface area. By providing the second magnetic material layer 2 in parallel to the head running direction B and forming it in such a manner as not to have an edge in the head running direction B in the opposed surface area, the formation of a false gap in the head running direction B which would otherwise be caused by the second magnetic material layer 2 is avoided, and consequently, the generation of a false pulse is suppressed. On the other hand, the thickness t of the first magnetic material layer 1 in the head running direction B can be made sufficiently smaller than the recording wavelength, for example, 0.05 to 1.0 μm. FIG. 10 shows a solitary reproduced waveform by the thin film magnetic head of the present invention and its reproducing process. It will be seen from FIG. 10 that no waveform distortion occurs in principle.

FIGS. 3(A) through (F) illustrates a sequence of steps involved in the formation of the first magnetic material layer 1 of the thin film magnetic head depicted in FIG. 1. At first, the first magnetic material layer 1 is formed to a thickness sufficiently smaller than the recording wavelength, for example about 0.05 to 1.0 μm, on the non-magnetic substrate 3 by vapor deposition, electrodeposition, or sputtering [see FIG. 3(A)]. The first magnetic material layer 1 thus formed is subjected to patterning as by photolithography so that it is selectively etched into a comb-like form, each tooth having a width W corresponding to the track width [see FIG. 3(B)]. Then, the comb-shaped pattern is cut into individual chips as indicated by the one-dot chain lines [see FIG. 3(C)]. In this instance, the angle $\theta_1$ between the horizontal top surface of the substrate 3 and the cut end face can be set to any desired values except 0° and 180°. Incidentally, in order to perform crosstalk-free signal reproduction by two heads without providing a guard band between two adjacent tracks on a magnetic medium, it is desirable, in general that an azimuth angle of 10° to 45° be provided with respect to the gap of one of the two heads. Accordingly, the angle $\theta_1$ may preferably be set in the range of from 45° to 135°, taking such an azimuth angle into consideration. Next, the individual chips, each composed of the first magnetic material layer 1 and the non-magnetic substrate 3, are each welded or joined to the non-magnetic substrate 3 of another chip by the welding or adhesive agent 7 with the first magnetic material layer 1 sandwiched therebetween and the assembly thus obtained is welded or joined to still another non-magnetic substrate 3 [see FIG. 3(D)]. Thereafter the top surface of the substrate assembly holding the first magnetic layers 1 between the non-magnetic substrates 3 is ground, partly exposing the first magnetic material layers 1 [see FIG. 3(E)]. Then, the grounded surface is cleaned [see FIG. 3(F)]. The coil conductor layers 4 are disposed around and magnetically coupled with the exposed portion 1a of each first magnetic material layer 1 of such a compound substrate assembly composed of the non-magnetic substrates 3 and the first magnetic material layers 1. Then the second magnetic material layer 2 is formed which constitutes one of the pair of magnetic poles, and the head protective film 5 is formed. In this way, the thin film magnetic head is produced. After the formation of each head, its surface area head which is to be opposed to the magnetic recording medium is rounded by polishing so that the second magnetic material layer 2 has no edges in the head running direction B.

Figure 4:
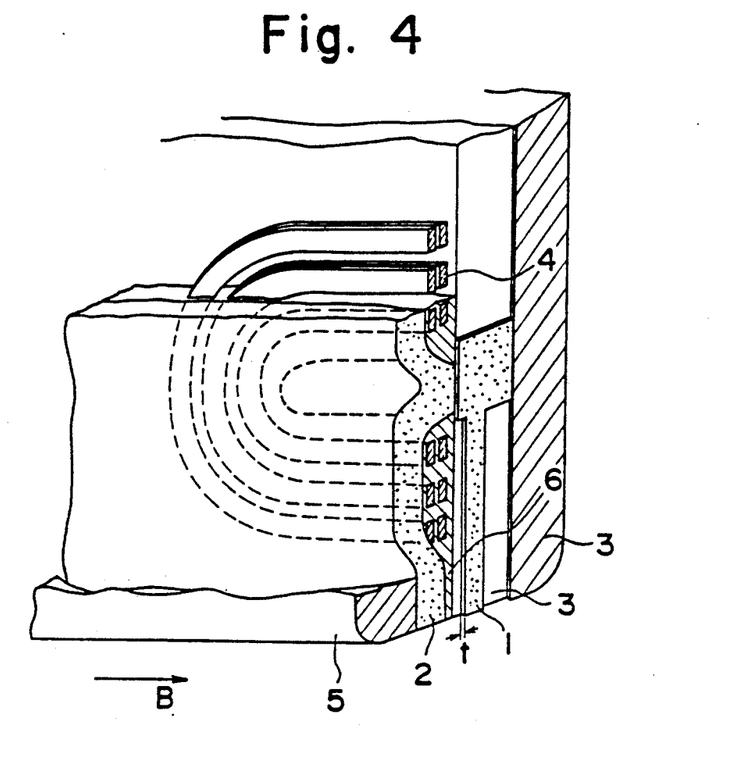
FIG. 4 is a perspective view showing, in section, the principal part of another embodiment of the present invention along the line IV—IV in FIG. 6.
Figure 5:
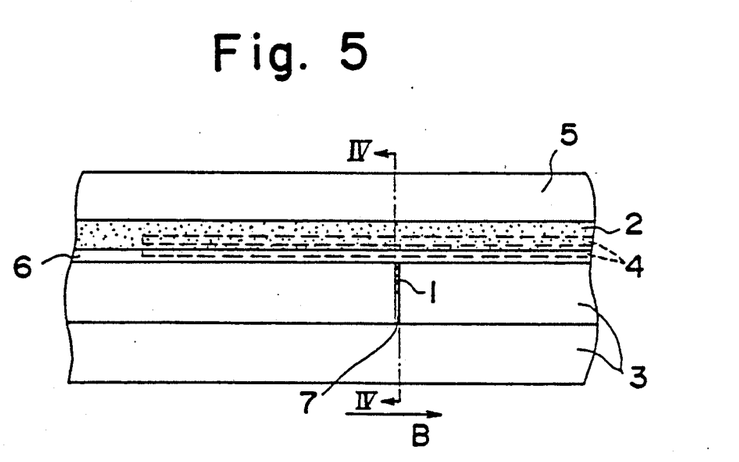
FIG. 5 is a plan view of the head as viewed from the side of its sliding surface.

FIGS. 4 and 5 illustrate another embodiment of the thin film magnetic head of the present invention in which the space of the first and second magnetic material layers 1 and 2 in the FIG. i embodiment is reduced. The thickness of the coil insulating layer 6 is reduced in the opposed surface area and the second magnetic material layer 2 is formed near the non-magnetic substrate 3 accordingly, thereby decreasing the space of the first and second magnetic material layers 1 and 2.

Figure 6:
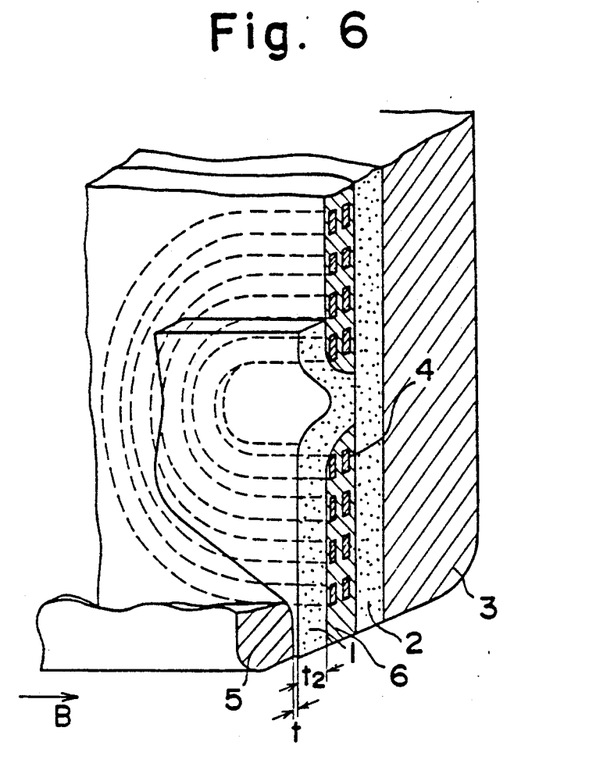
FIG. 6 is a perspective view showing, in section the principal part of still another embodiment of the present invention along the line VI—VI in FIG. 7.
Figure 7:
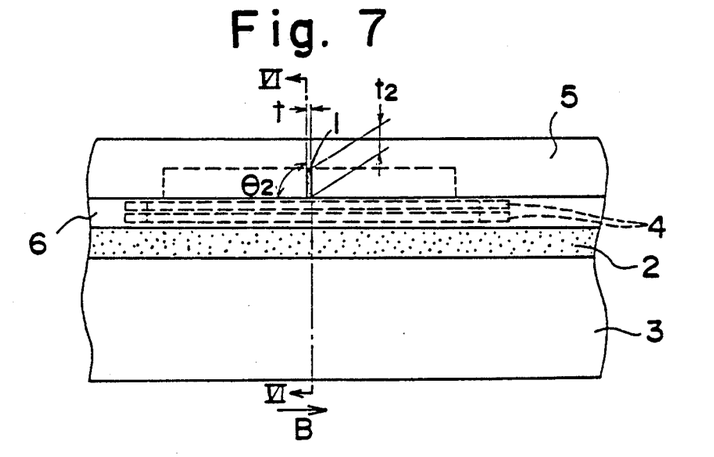
FIG. 7 is a plan view of the head s viewed from the side of its sliding surface.

FIGS. 6 and 7 illustrate another embodiment of the thin film magnetic head of the present invention. Unlike in the above-mentioned embodiments the second magnetic material layer 2 is formed on the non-magnetic substrate 3 and then the coil conductor layers 4, the coil insulating layer 6, the first magnetic material layer 1 and the head protective film 5 are laminated in this order on the second magnetic material layer 2. The thickness $t_2$ of the first magnetic material layer 1 in the direction of lamination is selected equal to the track width. In this instance the first magnetic material layer 1 is formed so that its thickness t in the head running direction B is 0.05 to 1.0 μm in the opposed surface area but gradually increases as it extends backwardly thereof. Further, the film of the first magnetic material layer 1, which has the thickness t in the opposed surface area, is formed so that it extends in a direction at an angle $\theta_2$ of any desired values except 0° and 180°, for example, 90° in this embodiment, with respect to the second magnetic material layer 2.

Figure 8:
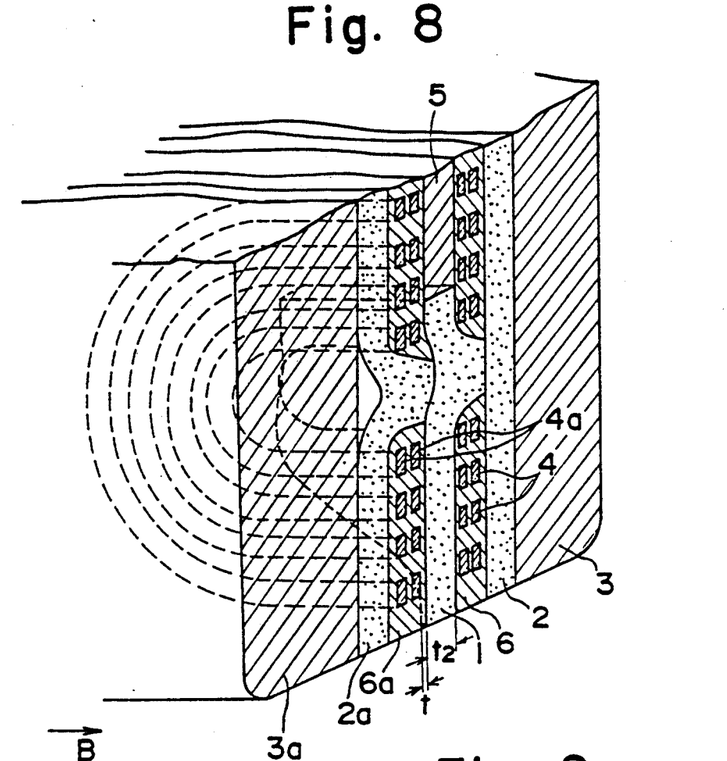
FIG. 8 is a perspective view showing, in section, the principal part of further another embodiment of the present invention along the line VIII—VIII in FIG. 9.
Figure 9:
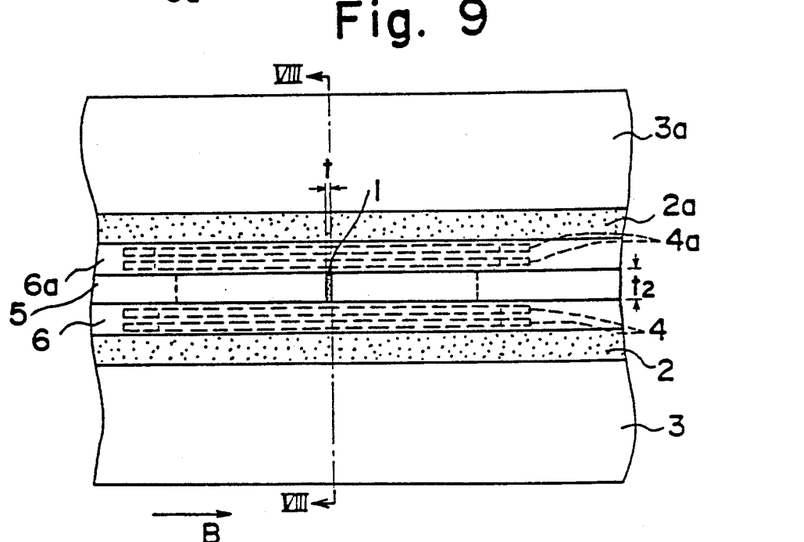
FIG. 9 is a plan view of the head as viewed from the side of its sliding surface.

FIGS. 8 and 9 illustrate still another embodiment of the thin film magnetic head of the present invention, in which another set of coil conductor layers 4a and another second magnetic material layer 2a are laminated on the first magnetic material layer 1 of the magnetic head shown in FIGS. 6 and 7, and finally non-magnetic substrate 3a is joined to them. This embodiment is intended to lessen the influence of an external electromagnetic disturbance by differential coupling of the coil conductor layers 4 and 4a. In this case, it is necessary that the additional second magnetic material layer 2a and the first magnetic material layer 1 be coupled to each other centrally of the coil conductor layers 4. The manufacturing process of this head from the formation of the second magnetic material layer 2 to the formation of the first magnetic material layer 1 is the same as in the case of the head depicted in FIGS. 6 and 7.

Now, a description will be given of a method of the magnetic head of the type shown in FIGS. 6 through 9.

At first, the second magnetic material layer 2 is formed on the non-magnetic substrate 3, the coil conductor layers 4 are formed on the second magnetic material layer 2, and the coil insulating layer 6 is formed on the coil conductor layers 4, followed by flattening the surface of the coil insulating layer 6. Then the first magnetic material layer is formed, on the substrate assembly, to the thickness $t_2$ corresponding to a desired track width through vapor deposition, electrodeposition or sputtering [see FIG. 11(A)]. Next, photoresist 21 is coated all over the first magnetic material layer 1 and is patterned as by photolithography into such a form in which its line width in the opposed surface area, that is, the width t in the head running direction is 0.05 to 1.0 μm and gradually increases as it extends backwardly of the opposed surface area [see FIG. 11(B)]. This patterning is anisotropic one by dry or wet etching or ion beam milling. Reference numeral 22 indicates ion beams. Although in this example the direction of etching, i.e. the angle $\theta_2$ of the first magnetic material layer 1 to the second magnetic material layer 2 is shown to be 90°, it may take any desired values except 0° and 180°. The above etching is followed by the removal of the remaining photoresist 21 [see FIG. 11(C)] and then by the formation of the head protective film 5 [see FIG. 11(D)]. As will be seen from this process diagram, the thickness $t_2$ of the first magnetic material layer 1 in the direction of lamination corresponding to the track width can be made highly accurate under thickness control even if the track width is very small, because the first magnetic material layer 1 is formed by vapor deposition, electrodeposition, or sputtering.

Figure 11:
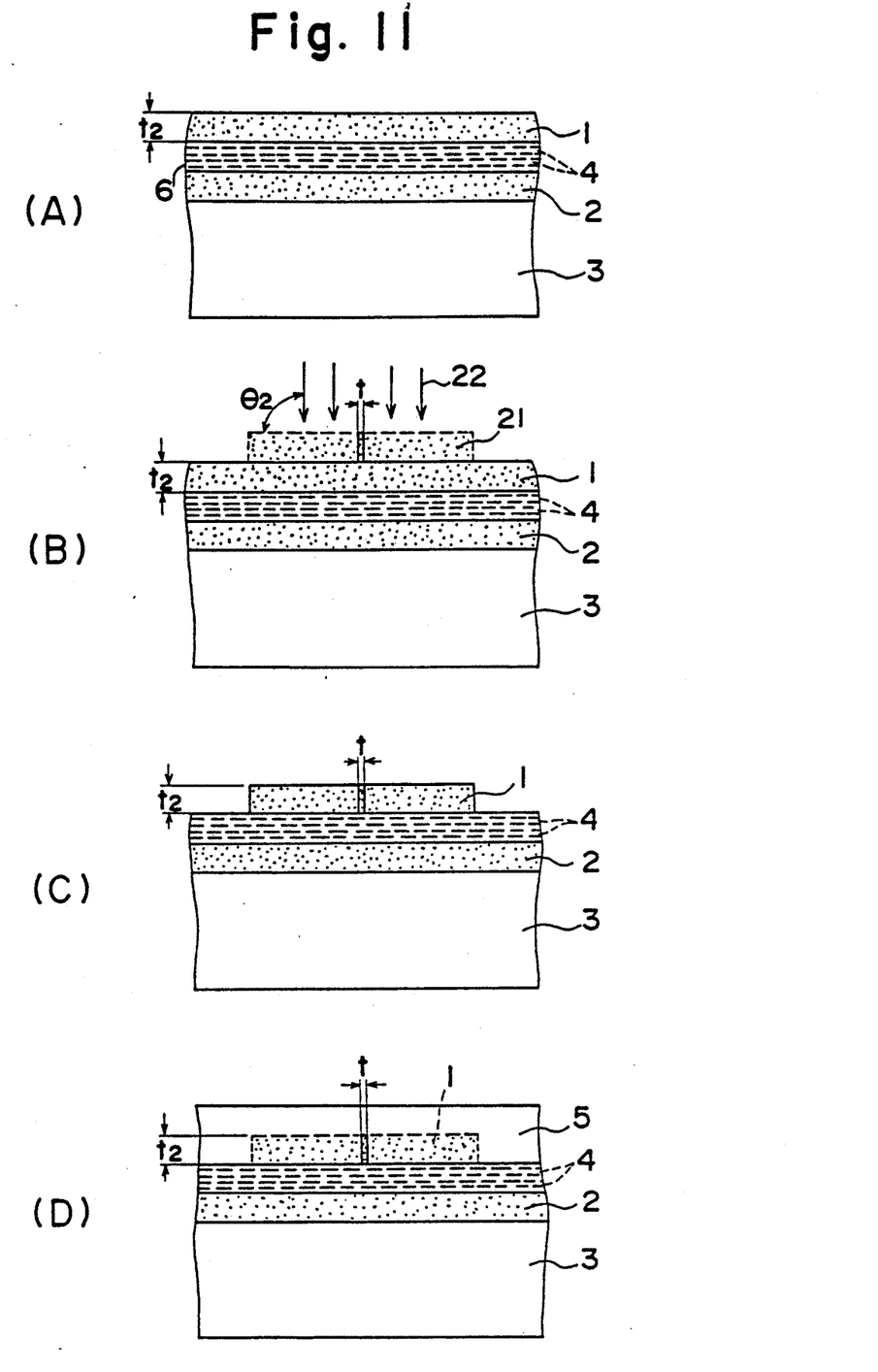

The manufacturing process of the present invention exemplified in FIG. 11 permits easy fabrication of the thin film magnetic head of FIG. 9 which is robust against an external electromagnetic disturbance. By repeating the manufacturing process it is possible to manufacture an in-line multichannel thin film magnetic head of little crosstalk.

FIG. 10 shows an example wherein the thin film magnetic head in the present invention is used as a reproducing head for an ordinary longitudinal magnetic recording medium. As shown, a datum stored in the longitudinal magnetic recording medium is being reproduced by the above-described magnetic head of the present invention, with a clear resulting solitary reproduced waveform. FIG. 10 shows that the first magnetic material layer 1 of the magnetic head of the present invention, is of such a thin film having thickness even smaller than the wave-length of the solitary waveform obtained. Accordingly, as can be seen from the clear solitary waveform, the head of the invention does not form the pseudo recording/reproducing gap which generated a pseudo pulse as found in the conventional ring-type magnetic head of FIG. 14, and further eliminates the distortion or irregularity of waveform in contrast to the conventional head.

The above embodiments are preferred embodiments of the present invention, it is intended as merely illustrative of the invention and should not be construed as limiting the invention specifically thereto, and many modifications and variations may be effected without departing from the scope of the novel concepts of the invention. For instance, the coil conductor layers 4 and 4a may also be formed by reluctance elements or elements utilizing ferromagnetic resonance. Further, it is a matter of course that a multichannel head can be fabricated by repeating one of the manufacturing processes of the heads of these embodiments. The reluctance elements and elements utilizing ferromagnetic resonance (which detect, as an output signal of a resonance circuit, a change in the high frequency permeability of a soft magnetic thin film such as an Ni—Fe film) may be disposed between the first and second magnetic material layers 1 and 2, or the first magnetic material layer 1 itself may also be replaced with the reluctance element and the element utilizing ferromagnetic resonance. Moreover, in the heads shown in FIGS. 7, 8 and 9 the non-magnetic substrate 3 may also be replaced with a magnetic substrate. In this instance since the magnetic substrate serves as the second magnetic material layer and constitutes a pair of magnetic poles in cooperation with the first magnetic material layer, the second magnetic material layer 2 can be left out. Besides, the first and second magnetic material layers 1 and 2 for improving the high frequency characteristics may each be formed by a laminated film including a non-magnetic intermediate film.

We claim:

1. A thin film magnetic head for use in a running direction with respect to a magnetic recording medium and in which a first magnetic material, a non-magnetic layer, a conductor layer, and a second magnetic material layer which constitute a pair of magnetic poles in cooperation with said first magnetic material layer, are laminated on a non-magnetic substrate, characterized in that the non-magnetic layer, the conductor layer and the second magnetic material layer are formed to be parallel to the running direction and the first magnetic layer is formed to be nonparallel to the running direction in at least an opposed surface area of said head which is to be opposed to a magnetic recording medium, the second magnetic material layer being formed so that it is opposed to the magnetic recording medium at said opposed surface area and so that the second magnetic material layer progressively extends away from the magnetic recording medium in an area of said head which is outside said opposed surface area.

2. A thin film magnetic head according to claim 1, characterized in that the second magnetic material layer includes means for terminating the second magnetic material layer progressively away from the magnetic recording medium and beyond the area of the head which is outside said opposed surface area.

3. A thin film magnetic head according to claim 1 or 2, characterized in that the thickness of the first magnetic material layer in the head running direction is in the range of between 0.05 to 1.0 μm.

4. A thin film magnetic head according to claim 1 wherein the conductor layer comprises a coil conductor layer.

5. A thin film magnetic head according to claim 1, characterized in that the second magnetic material layer, the first magnetic material layer, and another second magnetic material layer are sequentially formed on the non-magnetic substrate and the coil conductor layer and the non-magnetic layer are provided between each of the second magnetic material layers and the first magnetic material layer.

6. A thin film magnetic head according to claim 1 wherein the conductor layer comprises at least one magnetoresistance element.

7. A thin film magnetic head according to claim 1 wherein the conductor layer comprises at least one ferromagnetic resonance element.

8. A thin film magnetic head comprising: two non-magnetic layers formed along a direction of running of the head relative to a magnetic recording medium; another non-magnetic layer formed between the two non-magnetic layers along the head running direction; a second magnetic material layer formed between the said another non-magnetic layer and one of the two non-magnetic layers along the head running direction; a first magnetic material layer formed on said another non-magnetic layer in a plane nonparallel to the head running direction and connected to the second magnetic material layer; and coil conductor layers formed around the connecting portion of the first and second magnetic material layers.

9. A thin film magnetic head comprising:
- a non-magnetic substrate disposed along a direction of running of the head relative to a magnetic recording medium;
- a second magnetic material layer formed on the substrate along the head running direction;
- a first magnetic material layer having an exposed end which is nonparallel to the head running direction and a connecting portion where the first magnetic material layer is partly connected to the second magnetic material layer;
- a coil conductor layer provided between the first and second magnetic material layers around the connecting portion thereof; and
- a non-magnetic head protective layer surrounding the first magnetic material layer for protecting the first magnetic material layer.

10. A method for manufacture of a thin film magnetic head in which a second magnetic material layer, a gap material or non-magnetic oxide layer, coil conductor layers, a coil insulating layer, and a first magnetic material layer constituting a pair of magnetic poles in cooperation of said second magnetic material layer are laminated in this order on a substrate, the thin film magnetic head being movable in a direction parallel to surfaces of these layers, characterized in that the first magnetic material layer is formed to a thickness corresponding to a desired track width and is patterned by photolithography, etching, or ion beam milling such that, in an opposed surface area of the head which is to be opposed to a magnetic recording medium, the first magnetic material layer has a shape that it is in a nonparallel relation with the second magnetic material layer and further has a thickness which is sufficiently smaller than a recording wavelength of a resulting waveform obtained at a point where said first magnetic material layer is disposed in relation to said opposed surface area.

11. A think film magnetic head manufacturing method according to claim 10, characterized in that the first magnetic material layer is so formed as to assume such a shape that its width is 0.05 $\mu$m to 1.0 $\mu$m in said opposed surface area, and increases divergently in a progressive way as said first magnetic material layer proceeds away from said opposed surface area.

* * * * *